(12) United States Patent
Gatland

(10) Patent No.: US 10,444,349 B2
(45) Date of Patent: Oct. 15, 2019

(54) WAYPOINT SHARING SYSTEMS AND METHODS

(71) Applicant: FLIR Belgium BVBA, Meer (BE)

(72) Inventor: Christopher Daniel Gatland, Fareham (GB)

(73) Assignee: FLIR BELGIUM BVBA, Meer (BE)

( * ) Notice: Subject to any disclaimer, the term of this patent is extended or adjusted under 35 U.S.C. 154(b) by 340 days.

(21) Appl. No.: 15/441,148

(22) Filed: Feb. 23, 2017

(65) Prior Publication Data

US 2017/0160393 A1 Jun. 8, 2017

Related U.S. Application Data

(63) Continuation-in-part of application No. PCT/US2015/045962, filed on Aug. 19, 2015.
(Continued)

(51) Int. Cl.
*G01S 15/02* (2006.01)
*G01S 15/89* (2006.01)
(Continued)

(52) U.S. Cl.
CPC ............ *G01S 15/025* (2013.01); *G01C 21/20* (2013.01); *G01S 7/003* (2013.01); *G01S 7/6263* (2013.01);
(Continued)

(58) Field of Classification Search
CPC ...... G01S 15/025; G01S 7/6272; G01S 7/003; G01S 7/6281; G01S 15/89; G01S 7/6263; G01S 15/96; G01C 21/20
See application file for complete search history.

(56) References Cited

U.S. PATENT DOCUMENTS

| 5,633,710 A | 5/1997 | Kumra et al. |
| 7,098,458 B2 | 8/2006 | Kuerbitz et al. |

(Continued)

FOREIGN PATENT DOCUMENTS

| WO | WO 2010/141011 | 12/2010 |
| WO | WO 2013/108088 | 7/2013 |

(Continued)

OTHER PUBLICATIONS

"Augmented Reality App Now Available for Raymarine Dargonfly—PRO Sonar Systems", Raymarine, Nov. 23, 2016, 5 Pages[online]. Retrieved from the Internet: www.raymarine.com/view/blog/news/details/?ID=15032386189.
(Continued)

*Primary Examiner* — Daniel Pihulic
(74) *Attorney, Agent, or Firm* — Haynes and Boone, LLP

(57) ABSTRACT

Techniques are disclosed for systems and methods to provide waypoint sharing with respect to sonar imagery for mobile structures. A waypoint sharing system includes a portable electronic device with a display, a communications module, and a logic device configured to receive a waypoint database from a sonar system user interface or a waypoint server over a wireless communication link, receive user input to adjust at least a portion of the waypoint database, and provide the adjusted waypoint database to the sonar system user interface or the waypoint server over the wireless communication link. The sonar system user interface is configured to provide a waypoint database to the portable electronic device or the waypoint server over the wireless communication ink, receive the adjusted waypoint database from the device or the server over the wireless communication link, and render at least a portion of the adjusted waypoint database on a display.

26 Claims, 8 Drawing Sheets

Related U.S. Application Data

(60) Provisional application No. 62/300,007, filed on Feb. 25, 2016, provisional application No. 62/044,906, filed on Sep. 2, 2014.

(51) Int. Cl.
  *G01S 15/96* (2006.01)
  *G01S 7/62* (2006.01)
  *G01C 21/20* (2006.01)
  *G01S 7/00* (2006.01)

(52) U.S. Cl.
  CPC .......... *G01S 7/6272* (2013.01); *G01S 7/6281* (2013.01); *G01S 15/89* (2013.01); *G01S 15/96* (2013.01)

(56) References Cited

U.S. PATENT DOCUMENTS

| | | | |
|---|---|---|---|
| 9,488,488 B2 * | 11/2016 | Waldman | G01C 21/3602 |
| 2004/0032493 A1 | 2/2004 | Franke et al. | |
| 2010/0238161 A1 | 9/2010 | Varga et al. | |
| 2010/0245387 A1 | 9/2010 | Bachelder et al. | |
| 2011/0141242 A1 | 6/2011 | Fernandez Alvarez et al. | |
| 2013/0192451 A1 | 8/2013 | Scott et al. | |
| 2014/0022864 A1 * | 1/2014 | Lebedev | G01S 7/003 367/107 |
| 2014/0057677 A1 | 2/2014 | Liubinas et al. | |
| 2014/0064024 A1 | 3/2014 | Maguire | |
| 2015/0078123 A1 | 3/2015 | Batcheller et al. | |
| 2016/0027209 A1 | 1/2016 | Demirli et al. | |
| 2016/0063768 A1 | 3/2016 | Parente Da Silva | |
| 2016/0214534 A1 | 7/2016 | Richards et al. | |
| 2016/0259520 A1 | 9/2016 | Gatland | |
| 2017/0160393 A1 * | 6/2017 | Gatland | G01S 15/025 |
| 2017/0168159 A1 | 6/2017 | Gatland | |
| 2017/0176586 A1 | 6/2017 | Johnson et al. | |
| 2017/0227639 A1 | 8/2017 | Stokes et al. | |
| 2017/0312031 A1 | 11/2017 | Amanatullah et al. | |
| 2017/0312032 A1 | 11/2017 | Amanatullah et al. | |
| 2017/0323487 A1 | 11/2017 | Parente Da Silva | |
| 2018/0095170 A1 | 4/2018 | Gatland | |
| 2018/0105039 A1 | 4/2018 | Yeomans | |
| 2018/0106619 A1 | 4/2018 | Johnson et al. | |
| 2018/0143314 A1 | 5/2018 | Pelletier et al. | |
| 2018/0164434 A1 | 6/2018 | Stokes et al. | |
| 2018/0165870 A1 | 6/2018 | Stokes | |
| 2018/0217256 A1 | 8/2018 | Stokes | |
| 2018/0217257 A1 | 8/2018 | Murphy et al. | |
| 2018/0259338 A1 | 9/2018 | Stokes et al. | |
| 2018/0259339 A1 | 9/2018 | Johnson et al. | |

FOREIGN PATENT DOCUMENTS

| | | |
|---|---|---|
| WO | WO 2016/073060 | 5/2016 |
| WO | WO 2017/131838 | 8/2017 |

OTHER PUBLICATIONS

PCT Search Report, PCT Patent Application No. PCT/US2015/045962, dated May 12, 2016, 3 pages.

* cited by examiner

WAYPOINT SHARING SYSTEMS AND METHODS

CROSS-REFERENCE TO RELATED APPLICATIONS

This application claims priority to and the benefit of U.S. Provisional Patent Application. No. 62/300,007 filed Feb. 25, 2016 and entitled "WAYPOINT SHARING SYSTEMS AND METHODS", which is hereby incorporated by reference in its entirety.

This application is also a continuation-in-part of International Patent Application No. PCT/US2015/045962 filed Aug. 19, 2015 and entitled "AUGMENTED REALITY SONAR IMAGERY SYSTEMS AND METHODS", which claims priority to and the benefit of U.S. Provisional Patent Application No. 62/044,906 filed Sep. 2, 2014 and entitled "AUGMENTED REALITY SONAR IMAGERY SYSTEMS AND METHODS", all of which are hereby incorporated by reference in their entirety.

TECHNICAL FIELD

One or more embodiments of the invention relate generally to sonar systems and more particularly, for example, to systems and methods for sharing waypoints associated with sonar imagery.

BACKGROUND

Navigational waypoints may be used to facilitate bathymetry, detection of underwater hazards, fish finding, and/or otherwise assist in navigation by providing a set of positions and/or other characteristics associated with a body of water, a water column, and/or a floor of a body of water beneath a watercraft. Conventional navigational systems often include a display configured to provide traditionally recognizable waypoint interfaces. However, such conventional systems are unable to provide waypoints to other interfaces in a meaningful manner that allows user viewing and manipulation while, for example moving about a watercraft. Thus, there is a need for an improved methodology to provide waypoint sharing, particularly in the context of providing navigational aids important to general operation of a watercraft.

SUMMARY

Techniques are disclosed for systems and methods to provide waypoint sharing with respect to sonar imagery for mobile structures. A waypoint sharing system may include portable electronic and/or imaging devices, sonar transducer assemblies, and logic devices iii communication with the sonar transducer assemblies and portable electronic devices or a waypoint server. Each sonar transducer assembly may be adapted to be mounted to a mobile structure and placed in a body of water, and each portable electronic system may include an imaging module and a position and/or orientation sensor (IPOS). The logic devices may be configured to share one or more waypoints in a waypoint database and allow user input to adjust various characteristics of the waypoints and/or database.

In various embodiments, a waypoint sharing system may include one or more orientation sensors, position sensors, gyroscopes, accelerometers, and/or additional sensors, actuators, controllers, user interfaces, mapping systems, and/or other modules mounted to or in proximity to a vehicle. Each component of the system may be implemented with a logic device adapted to form one or more wired and/or wireless communication links for transmitting and/or receiving sensor signals, control signals, or other signals and/or data between the various components.

In one embodiment, a system may include a portable electronic device comprising a display, a communications module, and a logic device. The logic device may be configured to receive a waypoint database from a sonar system user interface or a waypoint server over a wireless communication link established using the communications module; receive user input to adjust at least a portion of the waypoint database; and provide the adjusted waypoint database to the sonar system user interface or the waypoint server over the wireless communication link.

In another embodiment, a system may include a sonar transducer assembly adapted to be mounted to a mobile structure and placed in a body of water and a sonar system user interface comprising a logic device configured to communicate with the sonar transducer assembly, a portable electronic device, and/or or a waypoint server. The logic device may be configured to provide a waypoint database to the portable electronic device or the waypoint server over a wireless communication link; receive an adjusted waypoint database from the portable electronic device or the waypoint server over the wireless communication link; and render at least a portion of the adjusted waypoint database on a display of the sonar system user interface.

In another embodiment, a method may include receiving a waypoint database from a sonar system user interface or a waypoint server over a wireless communication link; receiving user input to adjust at least a portion of the waypoint database; and providing the adjusted waypoint database to the sonar system user interface or the waypoint server over the wireless communication link. The method may also include providing the waypoint database to a portable electronic device or a waypoint server over the wireless communication link; receiving an adjusted waypoint database from the portable electronic device or the waypoint server over the wireless communication link; and rendering at least a portion of the adjusted waypoint database on a display of the sonar system user interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, waypoint sharing may be provided by a portable electronic and/or imaging device and a sonar system including one or more sonar transducer assemblies, orientation sensors, gyroscopes, accelerometers, position sensors, and/or speed sensors providing measurements of an orientation, a position, an acceleration, and/or a speed of the portable imaging device, the sonar transducer assemblies, and/or a coupled mobile structure. For example, the sensors may be mounted to or within the mobile structure (e.g., a watercraft, aircraft, motor vehicle, and/or other mobile structure), or may be integrated with the portable imaging device and/or the sonar transducer assemblies. Embodiments of the present disclosure provide waypoint sharing to allow rendering and/or manipulation of waypoints for a navigation and/or sonar/fishfinder system remotely.

Figure 1A:
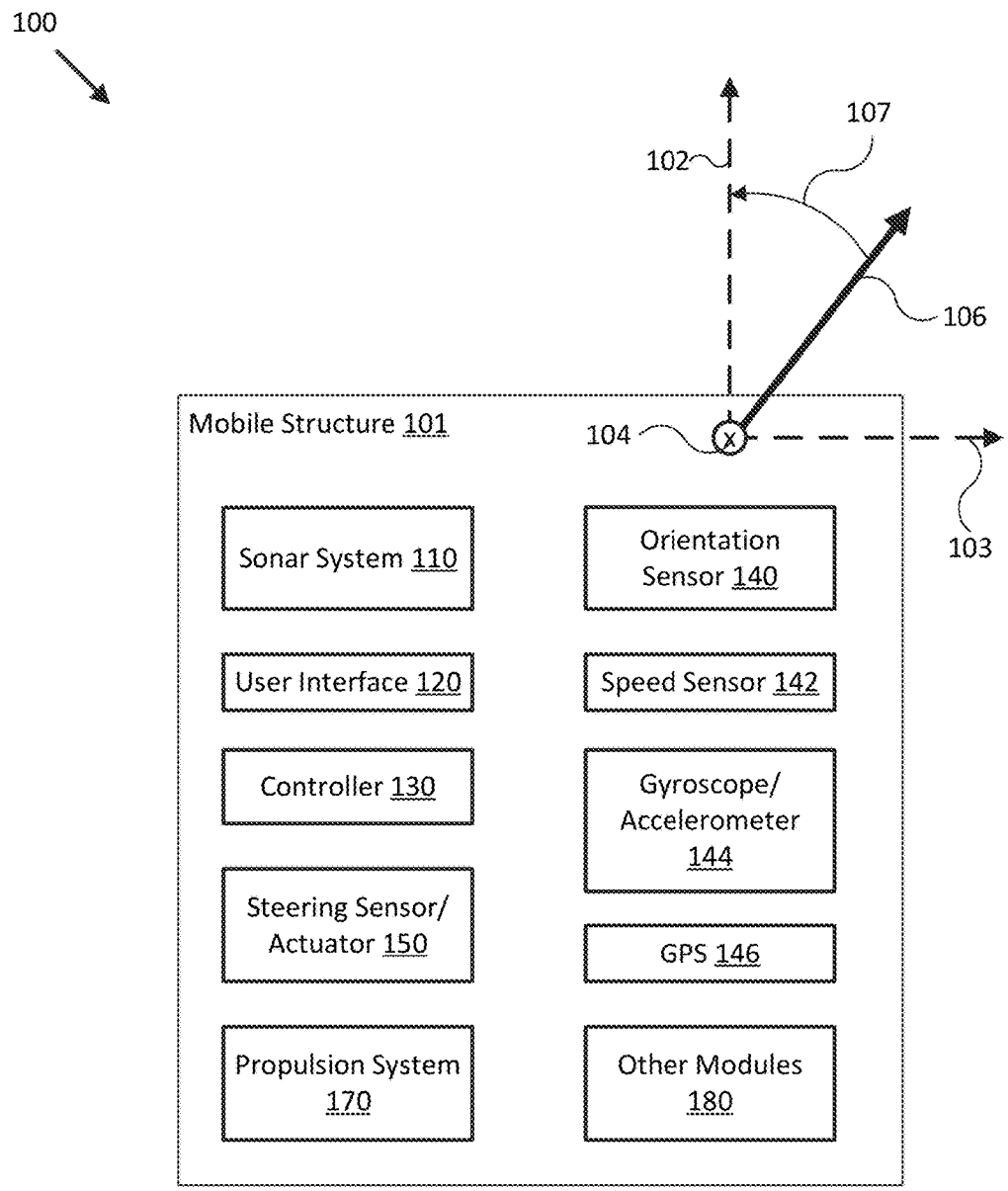
FIG. 1A illustrates a block diagram of a waypoint sharing system in accordance with an embodiment of the disclosure.

FIG. 1A illustrates a block diagram of system 100 in accordance with an embodiment of the disclosure. In various embodiments, system 100 may be adapted to measure an orientation, a position, an acceleration, and/or a speed of mobile structure 101, sonar system 110, and/or user interface 120. System 100 may then use these measurements to form various views of sonar data provided by sonar system 110 and/or to adjust an orientation of sonar system 110 according to a desired operation of sonar system 110 and/or mobile structure 101. In some embodiments, system 100 may display resulting sonar data and/or imagery to a user through user interface 120, and/or use the sonar data and/or imagery to control operation of mobile structure 101, such as controlling steering actuator 150 and/or propulsion system 170 to steer mobile structure 101 according to a desired heading, such as heading angle 107, for example.

In the embodiment shown in FIG. 1A, system 100 may be implemented to provide sonar data and/or imagery for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or other module of sonar system 110, and/or user interface 120) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 and referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein.

For example, in various embodiments, sonar system 110 may be implemented and/or operated according to any of the systems and methods described in U.S. Provisional Patent Application 62/005,838 filed May 30, 2014 and entitled "MULTICHANNEL SONAR SYSTEMS AND METHODS", and/or U.S. Provisional Patent Application 61/943,170 filed Feb. 21, 2014 and entitled "MODULAR SONAR TRANSDUCER ASSEMBLY SYSTEMS AND METHODS", both of which are hereby incorporated by reference in their entirety. In other embodiments, sonar system 110 may be implemented according to other sonar system arrangements that can be used to detect objects within a water column and/or a floor of a body of water.

More generally, sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

In some embodiments, sonar system 110 may be implemented using a compact design, where multiple sonar transducers, sensors, and/or associated processing devices are located within a single transducer assembly housing that is configured to interface with the rest of system 100 through a single cable providing both power and communications to and from sonar system 110. In some embodiments, sonar system 110 may include orientation and/or position sensors configured to help provide two or three dimensional waypoints, increase sonar data and/or imagery quality, and/or provide highly accurate bathymetry data, as described herein.

For example, fisherman desire highly detailed and accurate information and/or imagery of underwater structure and mid water targets (e.g., fish). Conventional sonar systems can be expensive and bulky and typically cannot be used to provide enhanced and/or augmented reality views, as described herein. Embodiments of sonar system 110 include low cost single, dual, and/or multichannel sonar systems that can be configured to produce detailed two and three dimensional sonar data and/or imagery. In some embodiments, sonar system 110 may consolidate electronics and transducers into a single waterproof package to reduce size and costs, for example, and may be implemented with a single connection to other devices of system 100 (e.g., via an Ethernet cable with power over Ethernet, an integral power cable, and/or other communication and/or power transmission conduits integrated into a single interface cable).

In various embodiments, sonar system 110 may be configured to provide many different display views from a variety of selectable perspectives, including down imaging, side imaging, and/or three dimensional imaging, using a selection of configurations and/or processing methods, as described herein. In some embodiments, sonar system 110 may be implemented with a single transducer assembly housing incorporating one or two transducers and/or associated electronics. In other embodiments, sonar system 110 may be implemented with a transducer assembly housing incorporating a multichannel transducer and/or associated electronics. In such embodiments, sonar system 110 may be configured to transmit acoustic beams using a transmission channel and/or element of a multichannel transducer, receive acoustic returns using multiple receive channels and/or elements of the multichannel transducer, and to perform beamforming and/or interferometry processing on the acoustic returns to produce two and/or three dimensional sonar imagery. In some embodiments, one or more sonar transmitters of sonar system 110 may be configured to use CHIRP transmissions to improve range resolution and hence reduce ambiguities typically inherent in interferometry processing techniques.

In various embodiments, sonar system 110 may be implemented with optional orientation and/or position sensors (e.g., similar to orientation sensor 140, gyroscope/accelerometer 144, and/or GPS 146) that may be incorporated within the transducer assembly housing to provide three dimensional orientations and/or positions of the transducer assembly and/or transducer(s) for use when processing or post processing sonar data for display. The sensor information can be used to correct for movement of the transducer assembly between ensonifications to provide improved alignment of corresponding acoustic returns/samples, for example, and/or to generate imagery based on the measured orientations and/or positions of the transducer assembly. In other embodiments, an external orientation and/or position sensor can be used alone or in combination with an integrated sensor or sensors.

In embodiments where sonar system 110 is implemented with a position sensor, sonar system 110 may be configured to provide a variety of sonar data and/or imagery enhancements. For example, sonar system 110 may be configured to provide accurate positioning of sonar data and/or user-defined waypoints remote from mobile system 101. Similarly, sonar system 110 may be configured to provide accurate two and/or three dimensional aggregation and/or display of a series of sonar data; without position data, a sonar system typically assumes a straight track, which can cause image artifacts and/or other inaccuracies in corresponding sonar data and/or imagery. Additionally, when implemented with a position sensor and/or interfaced with a remote but relatively fixed position sensor (e.g., GPS 146), sonar system 110 may be configured to generate accurate and detailed bathymetric views of a floor of a body of water.

In embodiments where sonar system 110 is implemented with an orientation and/or position sensor, sonar system 110 may be configured to store such location/position information along with other sensor information (acoustic returns, temperature measurements, text descriptions, water depth, altitude, mobile structure speed, and/or other sensor and/or control information) available to system 100. In some embodiments, controller 130 may be configured to generate a look up table so that a user can select desired configurations of sonar system 110 for a particular location or to coordinate with some other sensor information. Alternatively, an automated adjustment algorithm can be used to select optimum configurations based on the sensor information.

For example, in one embodiment, mobile structure 101 may be located in an area identified on an chart using position data, a user may have selected a user setting for a configuration of sonar system 110, and controller 130 may be configured to control an actuator and/or otherwise implement the configuration for sonar system 110 (e.g., to set a particular orientation). In still another embodiment, controller 130 may be configured to receive orientation measurements for mobile structure 101. In such embodiment, controller 130 may be configured to control the actuators associated with the transducer assembly to maintain its orientation relative to, for example, the mobile structure and/or the water surface, and thus improve the displayed sonar images (e.g., by ensuring consistently oriented acoustic beams and/or proper registration of a series of acoustic returns). In various embodiments, controller 130 may be configured to control steering sensor/actuator 150 and/or propulsion system 170 to adjust a position and/or orientation of mobile structure 101 to help ensure proper registration of a series of acoustic returns, sonar data, and/or sonar imagery.

Although FIG. 1A shows various sensors and/or other components of system 100 separate from sonar system 110, in other embodiments, any one or combination of sensors and components of system 100 may be integrated with a sonar assembly, an actuator, a transducer module, and/or other components of sonar system 110. For example, orientation sensor 140 may be integrated with a transducer module of sonar system 110 and be configured to provide measurements of an absolute and/or relative orientation (e.g., a roll, pitch, and/or yaw) of the transducer module to controller 130 and/or user interface 120, both of which may also be integrated with sonar system 110.

User interface 120 may be implemented as a display, a touch screen, a keyboard, a mouse, a joystick, a knob, a steering wheel, a ship's wheel or helm, a yoke, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user. In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly and/or module of sonar system 110) overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, route, and/or orientation for a transducer module, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device (e.g., sonar system 110) coupled to mobile structure 101, for example, and to generate control signals for adjusting an orientation of the actuated device according to the target attitude. More generally, user interface 120 may be adapted to display sensor information to a user, for example, and/or to transmit sensor information and/or user input to other user interfaces, sensors, or controllers of system 100, for instance, for display and/or further processing. In one embodiment, user interface 120 may be integrated with one or more sensors (e.g., imaging modules, position and/or orientation sensors, other sensors) and/or be portable (e.g., such as a portable touch display or smart phone, for example, or a wearable user interface) to facilitate user interaction with various systems of mobile structure 101.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communications module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other digital or analog device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 (e.g., or an element of mobile structure 101, such as sonar system 110 and/or user interface 120) based on wireless signals received from space-born and/or terrestrial sources, for example, and capable of providing such measurements as sensor signals that may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering or trim mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, infrared illuminators, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

For example, the same or similar components may be used to create an acoustic pulse (e.g., a transmission control signal and/or a digital shaping control signal), convert the acoustic pulse to an excitation signal (e.g., a shaped or unshaped transmission signal) and transmit it to a sonar transducer element to produce an acoustic beam, receive an acoustic return (e.g., a sound wave received by the sonar transducer element and/or corresponding electrical signals from the sonar transducer element), convert the acoustic return to acoustic return data, and/or store sensor information, configuration data, and/or other data corresponding to operation of a sonar system, as described herein.

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144, user interface 120, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
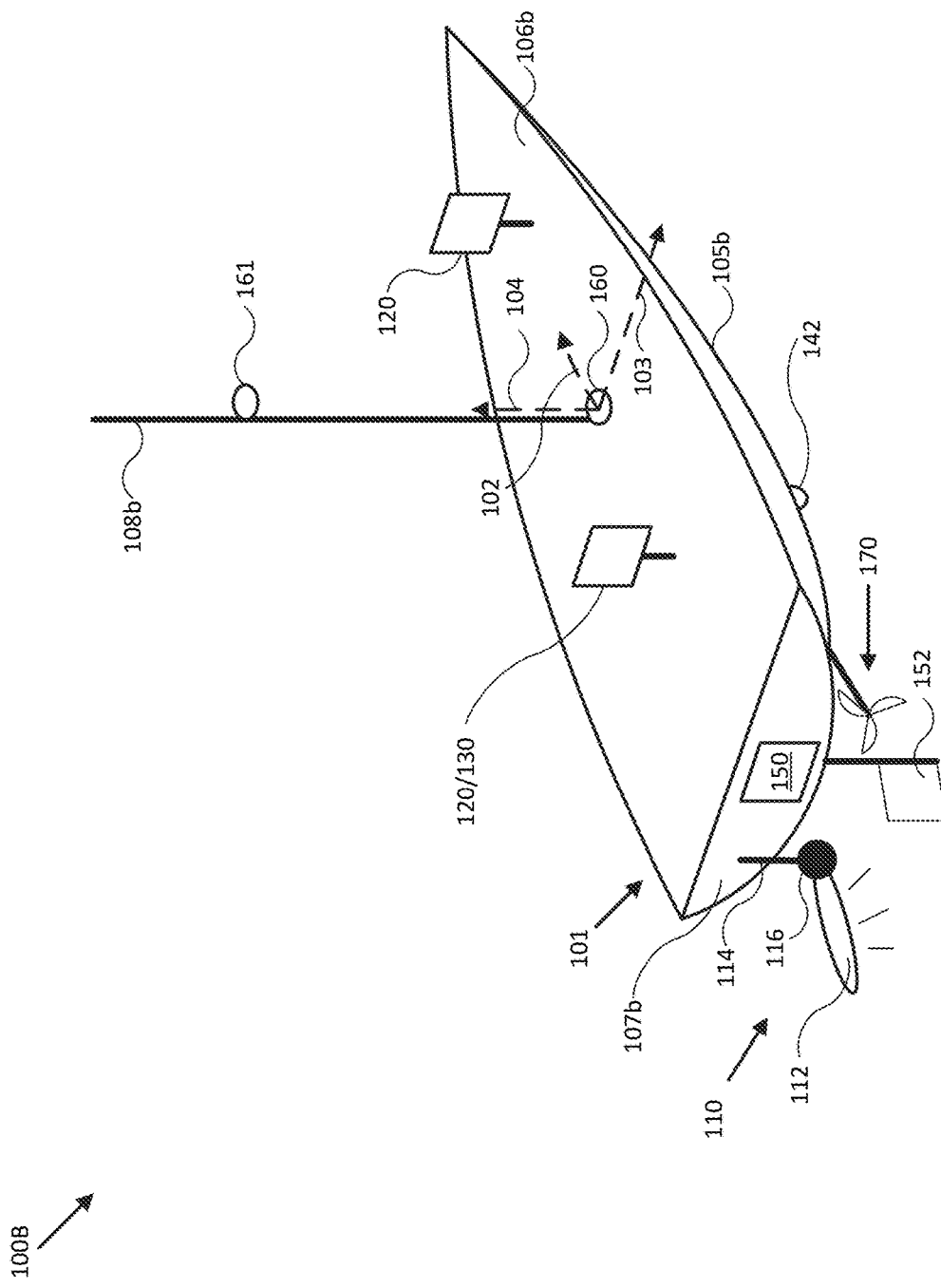
FIG. 1B illustrates a diagram of a waypoint sharing system in accordance with an embodiment of the disclosure.

FIG. 1B illustrates a diagram of system 100B in accordance with an embodiment of the disclosure. In the embodiment shown in FIG. 1B, system 100B may be implemented to provide sonar data and/or imagery for use with operation of mobile structure 101, similar to system 100 of FIG. 1B. For example, system 100B may include sonar system 110, integrated user interface/controller 120/130, secondary user interface 120, steering sensor/actuator 150, sensor cluster 160 (e.g., orientation sensor 140, gyroscope/accelerometer 144, GPS 146, and/or one or more other modules 180), imager cluster 161, and various other sensors and/or actuators. In the embodiment illustrated by FIG. 1B, mobile structure 101 is implemented as a motorized boat including a hull 105b, a deck 106b, a transom 107b, a mast/sensor mount 108b, a rudder 152, an inboard motor 170, and an actuated sonar system 110 coupled to transom 107b. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/elect conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130.

For example, user interface/controller 120/130 may be adapted to receive an orientation of transducer assembly 112 configured to ensonify a portion of surrounding water and/or a direction referenced to an absolute coordinate frame, and to adjust an orientation of transducer assembly 112 to retain ensonification of the position and/or direction in response to motion of mobile structure 101, using one or more orientations and/or positions of mobile structure 101 and/or other sensor information derived by executing various methods described herein. In some embodiments, user interface/controller 120/130 may be implemented as a multifunction display (MFD) configured to provide any portion of the functionality described with respect to user interface 120, controller 130, and/or sonar system 110, including to provide or receive signals to/from a transducer assembly and/or generate sonar imagery, as described herein.

In another embodiment, user interface/controller 120/130 may be configured to adjust an orientation of transducer assembly 112 to direct sonar transmissions from transducer assembly 112 substantially downwards and/or along an underwater track during motion of mobile structure 101. In such embodiment, the underwater track may be predetermined, for example, or may be determined based on criteria parameters, such as a minimum allowable depth, a maximum ensonified depth, a bathymetric route, and/or other criteria parameters. Transducer assembly 112 may be implemented with a sonar position and/or orientation sensor (SPOS), which may include one or more sensors corresponding to orientation sensor 140, gyroscope/accelerometer 144 and/or GPS 146, for example, that is configured to provide absolute and/or relative positions and/or orientations of transducer assembly 112 to facilitate actuated orientation of transducer assembly 112.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 can stay substantially level with respect to a horizon and/or a "down" vector (e.g., to mimic typical user head motion/orientation), for example, or so the display can be oriented according to a user's desired view. In another embodiment, at least one of user interfaces 120 may be located in proximity to mobile structure 101 and be mobile/portable throughout a user level (e.g., deck 106b) of mobile structure 101. For example, a secondary user interface 120 may be implemented with a lanyard, strap, headband, and/or other type of user attachment device and be physically coupled to a user of mobile structure 101 so as to be in proximity to the user and mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160.

Each sensor adapted to measure a direction (e.g., velocities, accelerations, headings, or other states including a directional component.) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 2B:
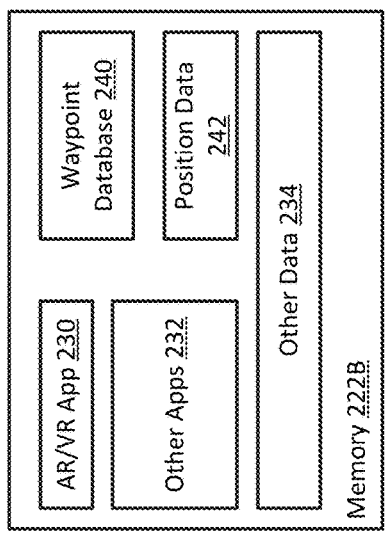
FIG. 2B illustrates a diagram of a memory for a waypoint sharing system in accordance with an embodiment of the disclosure.
Figure 2A:
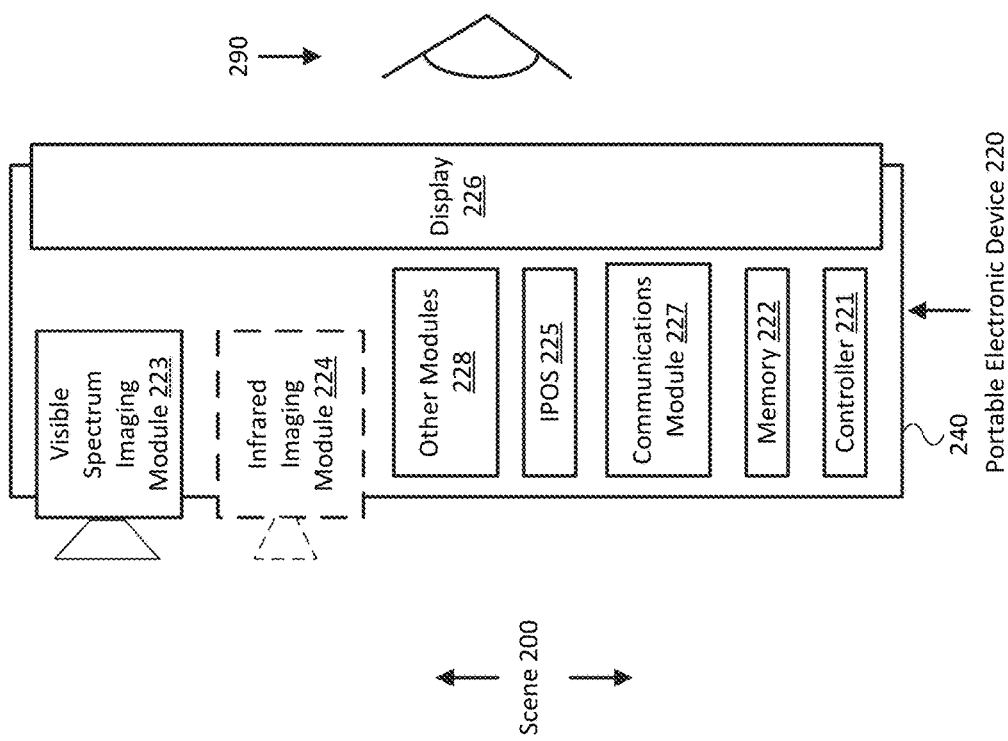
FIG. 2A illustrates a diagram of portable electronic device for a waypoint sharing system in accordance with an embodiment of the disclosure.

FIG. 2A illustrates a diagram of a waypoint sharing system including a portable electronic device 220 in accordance with an embodiment of the disclosure. In various embodiments, portable electronic device 220 may be implemented with similar functionality as that described with reference to user interface 120 and/or controller 130 in FIGS. 1A and 1B. In some embodiments, portable electronic device 220 may be implemented with similar functionality to a portable imaging device, such as those described in International Patent Application No. PCT/US2015/045962 filed Aug. 19, 2015 and entitled "AUGMENTED REALITY SONAR IMAGERY SYSTEMS AND METHODS", which is hereby incorporated by reference in its entirety. In the embodiment shown in FIG. 2A, portable electronic device 220 may be configured to provide visible spectrum imagery (e.g., using a visible spectrum imaging module 223), infrared spectrum imagery (using optional infrared imaging module 224), and/or sonar imagery (using sonar system 110 of FIGS. 1A and 1B) of scene 200 to a user 290 using a display 226. For example, portable electronic device 220 may be configured to display rendered image data (e.g., provided by imaging modules 223 and/or 224) in a portion of a field of view (FOV) of display 226 that is above a waterline and to display rendered sonar data in a portion of the FOV that is below a waterline.

Image data provided by imaging modules 223 and/or 224 may include an image of a surface of a body of water and various objects or structures above a waterline, such as the sun, a tree, and/or a beach. Sonar data, which may be provided by bathymetric charts and/or past or current use of sonar system 110 of FIGS. 1A and 1B, may include data representative of a waterline, a floor of body of water, a bank, a bottom feature (e.g., a rock or sunken ship), fish, other submerged objects (e.g., trash, seaweed), and/or other underwater features within or surrounding body of water. The portions of either or both the image data and the sonar data that are rendered and displayed by display 226, and the techniques used to render the imagery, may be selected based on the location of a waterline relative to an FOV of display 226 to provide augmented reality imagery, as described herein.

As shown, portable electronic device 220 may include one or more controllers 221 (e.g., including memory 222), imaging modules (e.g., visible spectrum imaging module 223 and/or infrared imaging module 224), other sensors (e.g., imager position and/or orientation sensor 225), display 226, communications module 227 (e.g., configured to form wireless communication links with elements of system 100, for example), and/or other modules 228 facilitating operation of portable electronic device 220, which may or may not all be disposed within a common housing 240. In other embodiments, one or more of the modules shown in FIG. 2A may be integrated with a stationary user interface and/or mount (e.g., coupled to deck 106b or mast/sensor mount 108b of mobile structure 101 in FIG. 1B) and be configured to communicate with devices within housing 240 through a distributed embodiment of communications module 227.

Visible spectrum imaging module 223 and infrared imaging module 224 may be electronic devices configured to capture imagery/image data of scene 200 according to their respective spectrums and provide images to controller 221. In some embodiments, visible spectrum imaging module 223 and infrared imaging module 224 may be implemented according to any similar devices described in U.S. patent application Ser. No. 14/138,058, filed Dec. 21, 2013, and entitled "COMPACT MULTI-SPECTRUM IMAGING WITH FUSION", which is hereby incorporated by reference in its entirety. Moreover, imagery provided by imaging modules 223 and 224 may be combined (e.g., blended, overlaid, fused, or otherwise combined) to provide combined (e.g., from multiple source spectrums) imagery/image data that may be rendered by portable electronic device 220 and/or displayed using display 226 using any of the methods described U.S. patent application Ser. No. 14/138,058 (incorporated by reference above) and/or as further described herein.

More generally, portable electronic device 220 may include a variety of imaging modules adapted to capture imagery (e.g., image and/or video data) according to visible spectrum, infrared, and other spectrums, for example, and provide corresponding image data to controller 221 or other controllers or devices for rendering and/or display. In some embodiments, imaging modules 223 and/or 224 may be mounted to a mobile structure separate from portable electronic device 220 (e.g., to deck 106b or mast/sensor mount 108b) of mobile structure 101 in FIG. 1B, using a fixed or actuated mounts such as imager cluster 161) and be configured to provide imagery to controller 221 using wired and/or wireless communications through communications module 227. In such embodiments, multiple portable imaging devices may be configured to share image data provided by imaging modules mounted to the mobile structure.

Controller 221 and/or memory 222 may each be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile structure 101, for example, similar to controller 130. In some embodiments, controller 221 may be in communication with various modules of portable electronic device 220 and be configured to receive imagery/image data of scene 200 from imaging modules 223 and/or 224, determine a waterline of a body of water in scene 200 (e.g., from image data, position data, and/or orientation data provided by the portable imaging device), render or display image data in any portion of an FOV of display 226 that extends above the waterline, and/or render and/or display sonar data in any portion of the FOV of display 226 that extends below the waterline.

In some embodiments, controller 221 may be configured to receive the sonar data and/or imagery from controller 130 and/or sonar system 110 of FIG. 1A or 1B, for example, based on a measured position and/or orientation of portable electronic device 220, either of imaging modules 223 and 224, and/or display 226, provided by imager position and/or orientation sensor (IPOS) 225. Such sonar data and/or imagery may include data from charts, prior ensonifications, and/or current sonar data or imagery provided by, for example, sonar system 110. In further embodiments, controller 221 may be tasked with generating sonar imagery from sonar data, correlating sensor data with sonar data/imagery, communicating operational parameters and/or sensor information with other devices, and/or other operations of systems 100 and/or 100B of FIGS. 1A and 1B. In various embodiments, controller 221 and memory 222 may be integrated together, for example, or may be implemented in a distributed manner across a number of individual controllers and/or memories.

In the embodiment shown in FIG. 2A, portable electronic device 220 includes IPOS 225. IPOS 225 may be implemented as one or more orientation sensors, GPS sensors, differential GPS sensors, orientation/position reference transducers and/or optical sensors (e.g., for actuators), visible spectrum and/or infrared imaging modules, and/or other sensors configured to measure a relative and/or absolute orientation and/or position of portable electronic device 220 and/or each of imaging modules 223 and 224 and display 226 and provide such measurements to controller 221. For example, in one embodiment, IPOS 225 may include one or more remote infrared imaging modules (e.g., implemented similar to infrared imaging module 224) fixed to a mobile structure and a number of infrared registration marks disposed on housing 240, and controller 221 may be configured to determine a relative position and/or orientation of portable electronic device 220 from the size and/or position of the infrared registration marks and/or other related characteristics of portable electronic device 220 in image data captured by the one or more remote infrared imaging modules. Such relative position and/or orientation may be relative to a position and/or orientation of the remote infrared imaging modules and/or the mobile structure.

In some embodiments, IPOS 225 may be distributed amongst the various modules of portable electronic device 220 and include one or more individual module IPOSs configured to measure positions and/or orientations of image modules 223 and/or 224 and a separate display IPOS configured to measure a position and/or orientation of display 226. In various embodiments, controller 221 may be configured to combine image data and sonar data according to IPOS measurements and/or measurements of an orientation and/or position of a coupled sonar system (e.g., from a corresponding SPOS) and/or mobile structure to produce combined imagery, such as visible spectrum images of scene 200 above the waterline and/or three dimensional sonar images of scene 200 below the waterline. In other embodiments, controller 221 may be configured to use orientation and/or position measurements of portable electronic device 220, imaging modules 223 and 224, display 226, and/or a mobile structure to control one or more actuators to adjust a position and/or orientation of imaging modules 223 and 224 and/or portions of an associated sonar system (e.g., transducer assembly 112) to image or ensonify a particular position and/or orientation of scene 200 relative to an FOV of display 226.

Display 226 may be implemented as one or more LCDs, OLEDs, touch screen displays, projection devices, and/or other digital displays that may be configured to display image data from imaging modules 223 and 224 and/or sonar data (e.g., from sonar system 110 of FIGS. 1A and 1B) rendered by controller 221 to user 290. In various embodiments, display 226 may be characterized by an FOV that is a function of the available pixel dimensions of display 226, the position and/or orientation of display 226, the FOVs of imaging modules 223 and/or 224, and an effective optical zoom level applied to the image data provided by imaging modules 223 and/or 224. For example, where imaging modules 223 and 224 are within the same housing 240 as display 226, the position and orientation of display 226 may be substantially the same as that of imaging modules 223 and/or 224, and the FOV of display 226 may be the same as that for imaging modules 223 and/or 224 as modified by the effective zoom level and the pixel dimensions of display 226. In other embodiments, where imaging modules 223 and/or 224 are mounted outside of housing 240, the FOV of display 226 may be dependent on the absolute or relative position and/or orientation of display 226 as compared to that of imaging modules 223 and/or 224.

In some embodiments, the effective optical zoom level may be adjusted to produce an FOV for display 226 that substantially reproduces a direct view of scene 200 as experienced by user 290, for example, so that objects within scene 200 are approximately the same size when viewed by user 290 with or without use of portable electronic device 220. In such embodiments, the effective optical zoom level may be adjusted by sensing a distance between user 290 and display 226 and then selecting the effective optical zoom level based on that distance to reproduce the direct view of scene 200. In other embodiments, the effective optical zoom level may be adjusted by user input to reproduce the direct view and/or to select a higher or lower effective optical zoom level to increase or decrease the FOV of and/or the image detail produced by display 226. The effective optical zoom level may be adjusted using digital image processing techniques, manual and/or actuated adjustment of optical components within imaging modules 223 and/or 224, or any combination of image processing or optical adjustments.

Communications module 227 may be implemented as any wired and/or wireless interface configured to communication sensor data, configuration data, parameters, and/or other data and/or signals between portable electronic device 220 and other elements of mobile structure 101 (e.g., as shown in FIGS. 1A and 1B) and/or amongst modules of portable electronic device 220. As described herein, in some embodiments, communications module 227 may be implemented in a distributed manner such that portions of communications module 227 are implemented within one or more modules of portable electronic device 220 that may or may not be disposed within housing 240.

Other modules 228 may include other and/or additional sensors, sensor arrays, actuators, logic devices, communications modules/nodes, power and/or power distribution components, and/or user interface devices used to provide additional environmental information and/or configuration parameters, for example, and/or to adjust a position and/or orientation of portable electronic device 220. In some embodiments, other modules 228 may include various environmental sensors providing measurements and/or other sensor signals that can be displayed to a user and/or used by other devices of portable electronic device 220 (e.g., controller 221) to facilitate operation of portable electronic device 220. In some embodiments, other modules 228 may include one or more buttons and/or other user input devices configured to accept manual user input. In other embodiments, other modules may include one or more distance detectors configured to detect user 290 and/or measure or estimate a distance between display 226 and user 290.

In various embodiments, portable electronic device 220 may be implemented in a single housing 240 with a single display (e.g., display 225) adapted to be held by user 290 while user 290 views the display. In other embodiments, housing 240 may be mounted to a mobile structure using a fixed or actuated mount to provide a fixed or actuated view relative to an orientation of the mobile structure. In some embodiments, portable electronic device 220 may be implemented as a wearable device, such as a pair of glasses including a plurality of displays configured to provide the same image to each eye of user 290 individually or to provide stereoscopic imagery to both eyes of user 290. Such stereoscopic imagery may be generated using multiple instances of imaging modules 223 and/or 224, for example, or by applying various image processing techniques to image and/or sonar data to provide a simulation of depth.

FIG. 2B illustrates a diagram of a memory 222B for a waypoint sharing system in accordance with an embodiment of the disclosure. In various embodiments, memory 222B may correspond to memory 222 of FIG. 2A. In other embodiments, memory 222B may correspond to one or more memories accessible by system 100 of FIG. 1A. As shown in FIG. 2B, memory 222B may be configured to store an augmented reality/virtual reality application 230, a waypoint database 240, position data 242, one or more other applications 232, and/or other data 234.

Augmented reality/virtual reality application 230 may be configured to render (e.g., on display 226) one or more waypoints in the waypoint database and/or an image of scene 200 according to the position and/or orientation of visible spectrum imaging module 223 and/or infrared imaging module 224 relative to scene 200, for example, to provide an augmented reality and/or virtual reality view of the waypoints and/or scene 200. Other applications 232 may include various chart or mapping applications configured to render a map of at least a portion of waypoint database 240 on display 226 and/or to receive user input (e.g., through display 226 and/or another form of user interface) to adjust characteristics of one or more waypoints within waypoint database 240, to add one or more waypoints to waypoint database 240, and/or to remove one or more waypoints from waypoint database 240, to adjust waypoint database 240.

Waypoint database 240 may include one or more waypoints and their characteristics (e.g., position, type, depth, time of creation, and/or other characteristics) in a form that can be transmitted between portable electronic device 220 and user interface 120 over a wireless communication link, for example. Position data 242 may include position data (e.g., from an SPOS or IPOS) that may be transmitted over a wireless communication link, for example. Other data 234 may include sonar imagery, sonar data, other sensor data, configuration parameters, and/or other data described herein.

Figure 3:
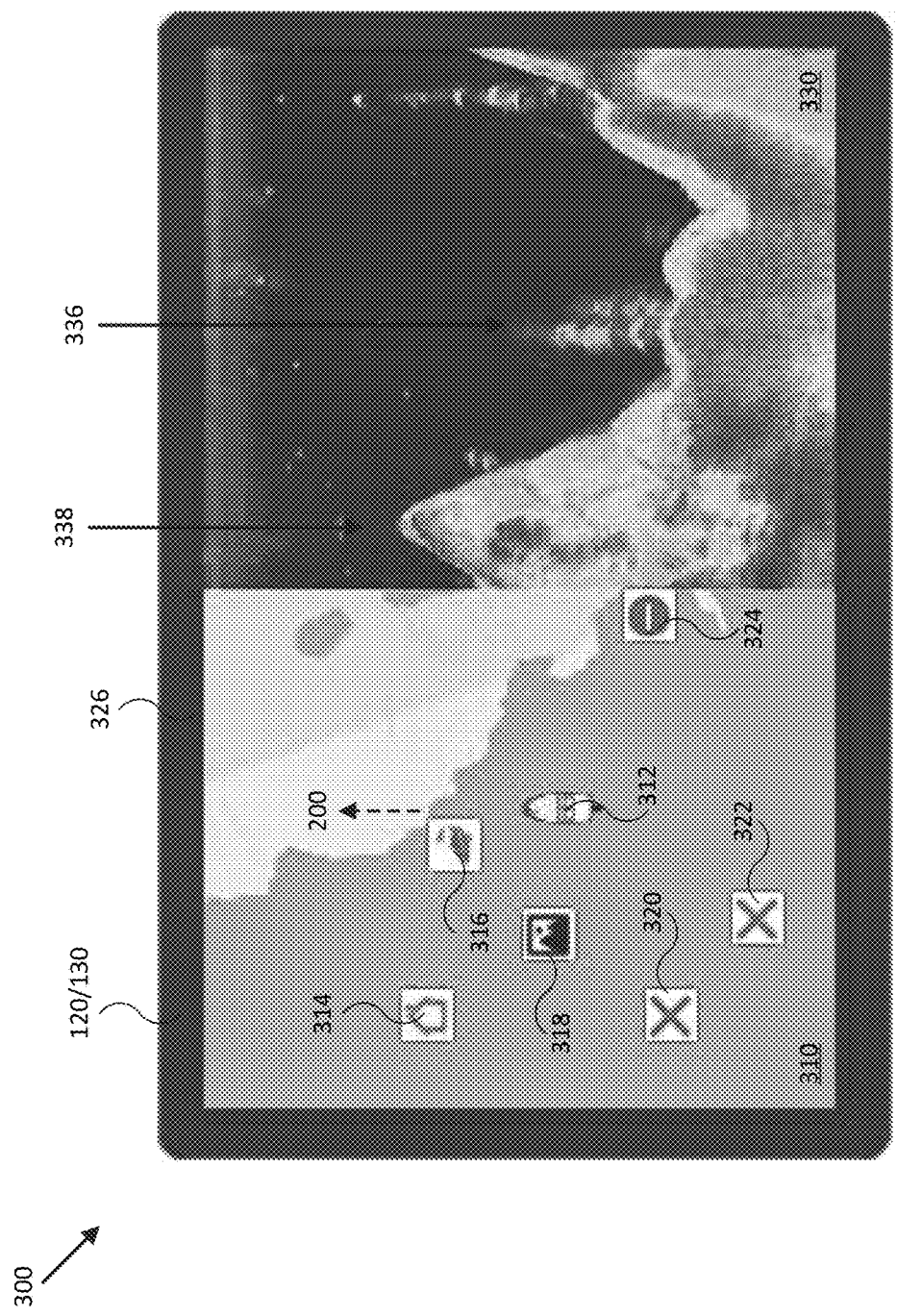
FIG. 3 illustrates a diagram of a display for a sonar system user interface of a waypoint sharing system in accordance with an embodiment of the disclosure.

FIG. 3 illustrates a diagram 300 of display for a sonar system user interface (e.g., user interface/controller 120/130) of a waypoint sharing system in accordance with an embodiment of the disclosure. As shown in FIG. 3, sonar system user interface 120/130 may be configured to render chart 310 on the left side of display 326 and sonar imagery 330 on a right side of display 326. In other embodiments, the entirety of display 326 may be dedicated to chart 310 or sonar imagery 330, one or the other of chart 310 or sonar imagery 330 may be inset in the other, and/or other presentations are contemplated, including rendering navigational aids and/or user input buttons on display 326. As shown in FIG. 3, chart 310 may include an area around a position of mobile structure 101 (e.g., indicated by watercraft icon 312) that generally includes scene 200.

Chart 310 may include a variety of icons indicating type and/or position of various waypoints. For example, as shown in FIG. 3, chart 310 includes watercraft indicator 312 (e.g., indicating the position of mobile structure 101), home waypoint 314 (e.g., indicating a mooring point or a starting position before travel, for example), fishing waypoint 316 (e.g., indicating a position where fish have been identified in sonar data), shallow hazard waypoint 318, rout waypoints 320 and 322 (e.g., which may in some embodiments be differentiated by color, such as red and blue, to indicate order, context such as wave height or water depth, and/or other differentiated waypoint characteristics), and non-entry waypoint 324 (e.g., indicating a no-go zone for mobile structure 101). Sonar imagery 330 shows corresponding underwater features such as shallows 338 (e.g., corresponding to shallow hazard waypoint 318) and fish 336 (e.g., corresponding to fishing waypoint 316). In various embodiments, sonar system user interface 120/130 may be configured to receive user input designating a position and/or other characteristics of each waypoint and/or to determine various characteristics of the waypoints from corresponding features within sonar imagery 330. Moreover, sonar system user interface 120/130 may be configured to generate a waypoint database including the positions and/or other characteristics of the waypoints entered into sonar system user interface 120/130. Such characteristics may include, for example, the type of waypoint, a depth (e.g., of a shallows or of fish), a time of entry, an order (e.g., such as for a route or series of waypoints), a range (e.g., such as a no-go range associated with non-entry waypoint 324), and/or other waypoint characteristics.

Figure 4:
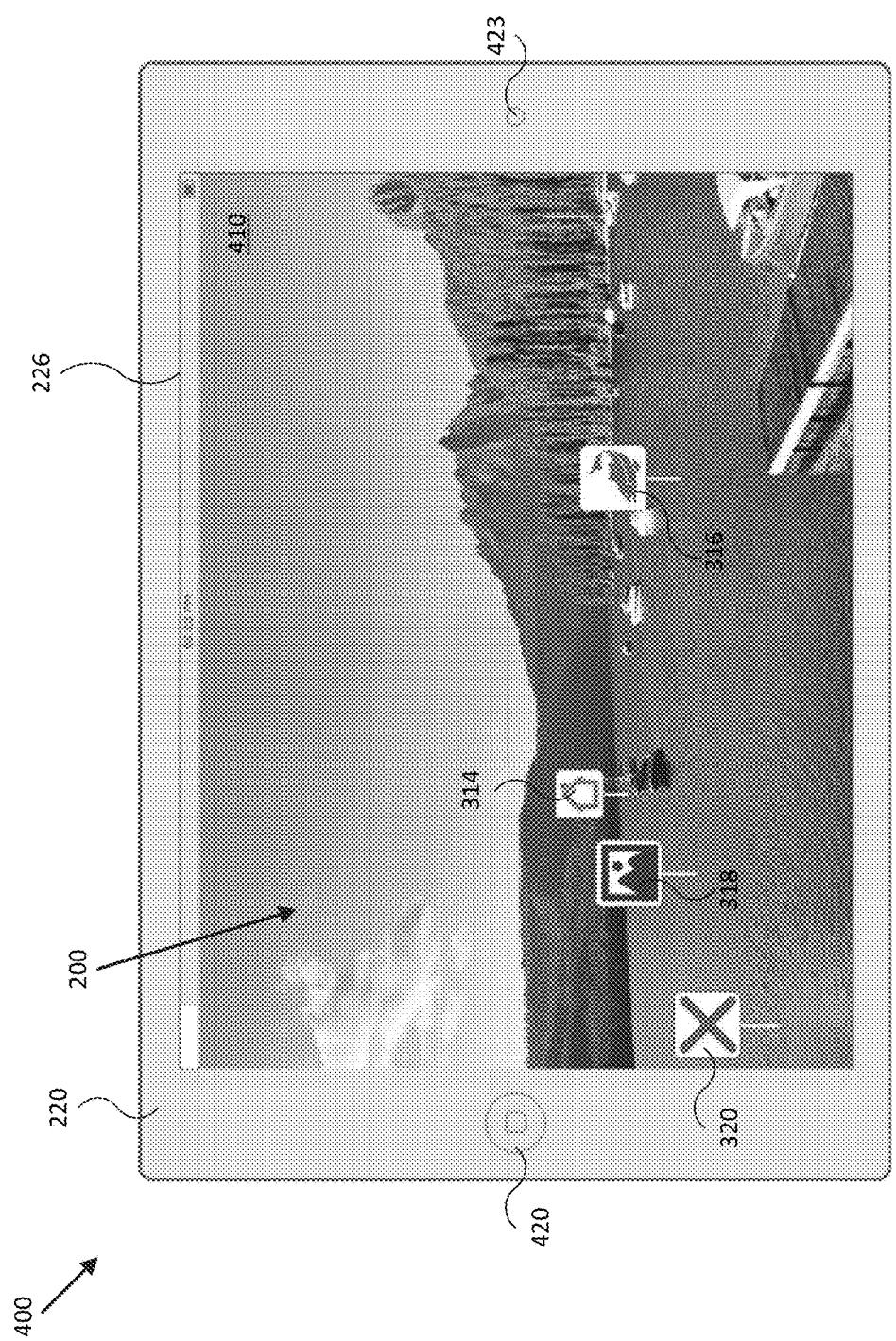
FIG. 4 illustrates a diagram of a display for a portable electronic device of a waypoint sharing system in accordance with an embodiment of the disclosure.

FIG. 4 illustrates a diagram 400 of display 226 for portable electronic device 220 of a waypoint sharing system in accordance with an embodiment of the disclosure. As shown in FIG. 3, portable electronic device 300 may be configured to render image 410 of scene 200 on display 226. In the embodiment shown in FIG. 4, image 410 includes an augmented reality or virtual reality representation of scene 200 with various waypoints rendered within the image to indicate their positions relative to each other and/or to the imaging module used to image scene 200 (e.g., visible spectrum imaging module 223). As shown in FIG. 4, image 410 includes home waypoint 314, fishing waypoint 316, shallow hazard waypoint 318, and rout waypoint 320 rendered in chart 310 of FIG. 3. In some embodiments, portable electronic device 300 may include one or more buttons 420 and/or additional visible spectrum or infrared imaging modules aimed towards a user (e.g., to facilitate video conferencing to sonar system user interface 120/130, for example), such as imaging module 423.

In various embodiments, portable electronic device 300 may be configured to receive user input to adjust characteristics of one or more of the waypoints rendered in image 410, to add one or more waypoints to waypoint database 240, and/or to remove one or more waypoints from waypoint database 240, to adjust waypoint database 240. In some embodiments, portable electronic device 300 may be configured to execute one or more applications to provide such functionality and/or to render image 410. Portable electronic device 300 may also be configured to capture image 410 of scene 200 using visible spectrum imaging module 223 and to render (e.g. on display 226), the various waypoints and image 410 according to the position and/or orientation of visible spectrum imaging module 223 relative to scene 200. Portable electronic device 300 may receive orientation and/or position data from IPOS 225, for example, and/or may receive position data from sonar system user interface 120/130 over a wireless communication link. Portable electronic device 300 may also receive and/or render sonar imagery provided by sonar system user interface 120/130 (e.g., by an SPOS of sonar system user interface 120/130) over a wireless communication link.

Figure 5:
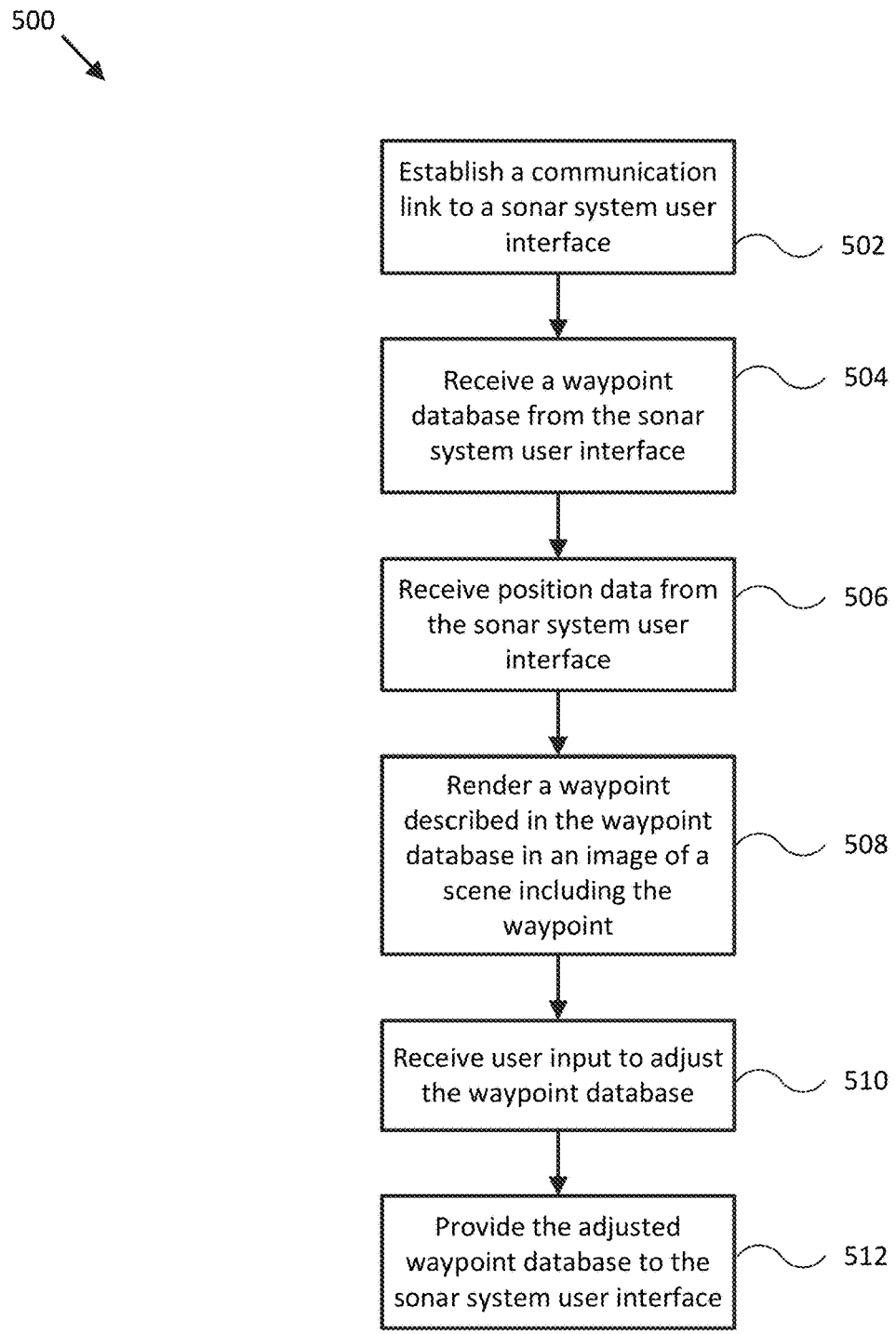
FIG. 5 illustrates a flow diagram of various operations to operate a waypoint sharing system in accordance with an embodiment of the disclosure.

FIG. 5 illustrates a flow diagram of process 500 to provide waypoint sharing for mobile structure 101 in accordance with embodiments of the disclosure. In some embodiments, the operations of FIG. 5 may be implemented as software instructions executed by one or more logic devices associated with corresponding electronic devices, sensors, and/or structures depicted in FIGS. 1A through 4. More generally, the operations of FIG. 5 may be implemented with any combination of software instructions and/or electronic hardware (e.g., inductors, capacitors, amplifiers, actuators, or other analog and/or digital components).

It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems described in reference to FIGS. 1A-4, process 500 may be performed by other systems different from those systems and including a different selection of electronic devices, sensors, assemblies, mobile structures, and/or mobile structure attributes.

Process 500 represents a method for providing waypoint sharing using systems 100, 100B, and/or 220 in accordance with embodiments of the disclosure. At the initiation of process 500, various system parameters may be populated by prior execution of a process similar to process 500, for example, or may be initialized to zero and/or one or more values corresponding to typical, stored, and/or learned values derived from past operation of process 500, as described herein.

In block 502, a logic device establishes a communication link to a sonar system user interface. For example, controller 221 of portable electronic device 220 may be configured to establish a communication link to sonar system user interface 120/130. In block 504, a logic device receives a waypoint database from a sonar system user interface. For example, controller 221 of portable electronic device 220 may be configured to receive waypoint database 240 from sonar system user interface 120/130. In some embodiments, portable electronic device 220 may be configured to store waypoint database 240 in memory 222 of portable electronic device 220.

In block 506, a logic device receives position data from a sonar system user interface. For example, controller 221 of portable electronic device 220 may be configured to receive position data 242 from sonar system user interface 120/130 and/or from an SPOS (e.g., orientation sensor 140, gyroscope/accelerometer 144 and/or GPS 146) over a wireless communication link. In some embodiments, portable electronic device 220 may be configured to receive sonar data and/or imagery from sonar system user interface 120/130 over a wireless communication link.

In block 508, a logic device renders a waypoint described in a waypoint database in an image of a scene including the waypoint. For example, controller 221 of portable electronic device 220 may be configured to render one or more waypoints (e.g., as shown in FIGS. 3 and 4) described in waypoint database 240 in image 410 of scene 200 including the waypoints (e.g., as shown in FIGS. 3 and 4). In some embodiments, portable electronic device 220 may be configured to capture image 410 of scene 200 using visible spectrum imaging module 223 and render, on display 226, the one or more waypoints and image 410 according to the position and/or orientation of visible spectrum imaging module 223 relative to scene 200. Such position and/or orientation of visible spectrum imaging module 223 may be provided by IPOS 225 and/or by sonar system user interface 120/130 over a wireless communication link. In embodiments where portable electronic device 220 has received sonar data and/or imagery 330 from sonar system user interface 120/130 (e.g., in block 506), portable electronic device 220 may be configured to render sonar imagery 330 on display 226. In various embodiments, portable electronic device 220 may be configured to execute a mapping application to render a map of at least a portion of waypoint database 240 on display 226.

In block 510, a logic device receives user input to adjust a waypoint database. For example, controller 221 of portable electronic device 220 may be configured to receive user input (e.g., at display 226) to adjust one or more characteristics of a waypoint within waypoint database 240, to add one or more waypoints to waypoint database 240, and/or to remove one or more waypoints from waypoint database 240, to adjust waypoint database 240. In various embodiments, portable electronic device 220 may be configured to execute a mapping application to render a map of at least a portion of waypoint database 240 on display 226 and/or to receive user input to adjust characteristics of one or more waypoints within waypoint database 240, to add one or more waypoints to waypoint database 240, and/or to remove one or more waypoints from waypoint database 240, to adjust waypoint database 740.

In block 512, a logic device provides an adjusted waypoint database to a sonar system user interface. For example, controller 221 of portable electronic device 220 may be configured to provide an adjusted waypoint database 240 to sonar system user interface 120/130.

Figure 6:
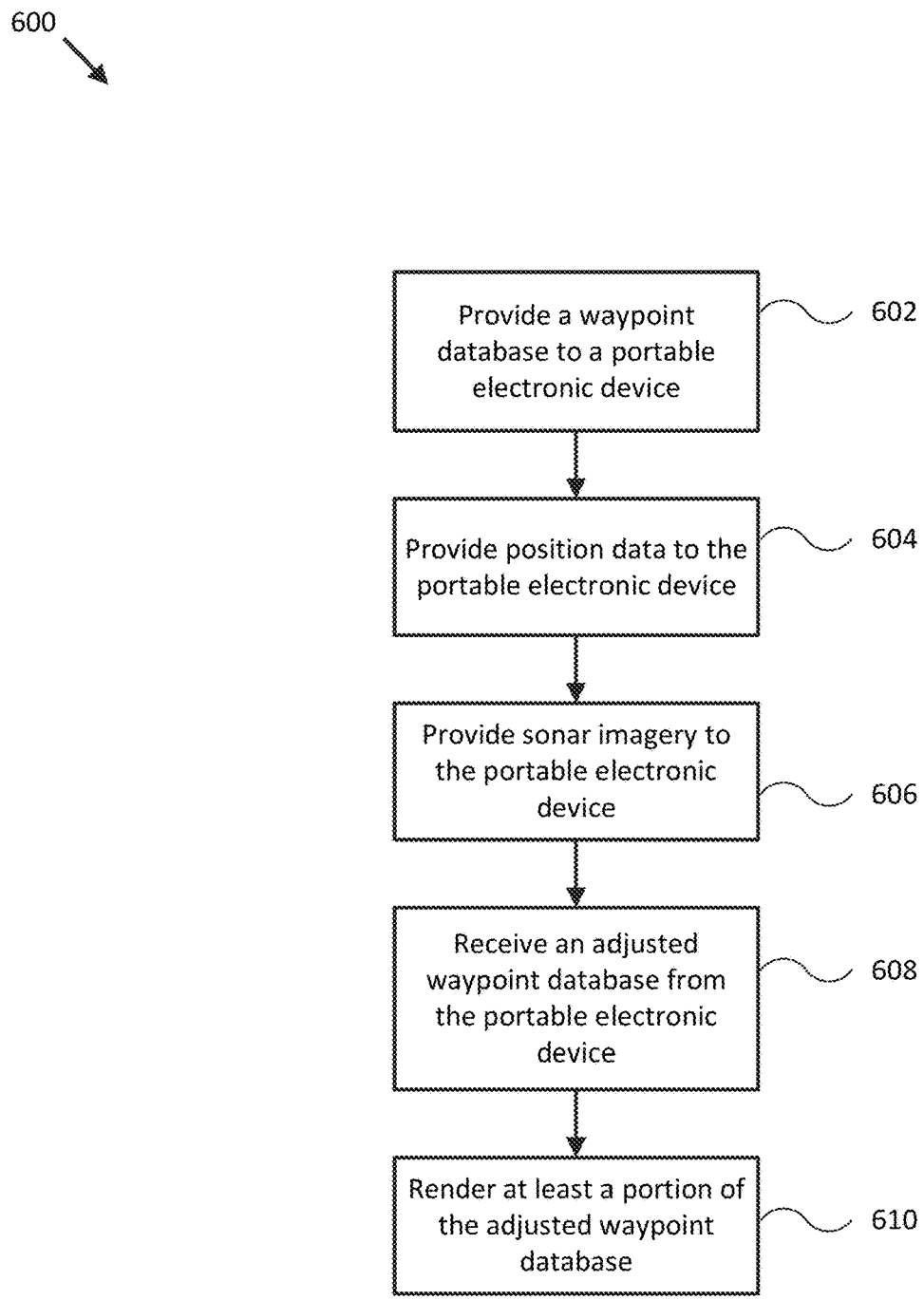
FIG. 6 illustrates a flow diagram of various operations to operate a waypoint sharing system in accordance with an embodiment of the disclosure.

FIG. 6 illustrates a flow diagram of process 600 to provide waypoint sharing for mobile structure 101 in accordance with embodiments of the disclosure. In some embodiments, the operations of FIG. 6 may be implemented as software instructions executed by one or more logic devices associated with corresponding electronic devices, sensors, and/or structures depicted in FIGS. 1A through 4. More generally, the operations of FIG. 6 may be implemented with any combination of software instructions and/or electronic hardware (e.g., inductors, capacitors, amplifiers, actuators, or other analog and/or digital components).

It should be appreciated that any step, sub-step, sub-process, or block of process 600 may be performed in an order or arrangement different from the embodiments illustrated by FIG. 6. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems described in reference to FIGS. 1A-4, process 600 may be performed by other systems different from those systems and including a different selection of electronic devices, sensors, assemblies, mobile structures, and/or mobile structure attributes.

Process 600 represents a method for providing waypoint sharing using systems 100, 100B, and/or 220 in accordance with embodiments of the disclosure. At the initiation of process 600, various system parameters may be populated by prior execution of a process similar to process 600, for example, or may be initialized to zero and/or one or more values corresponding to typical, stored, and/or learned values derived from past operation of process 600, as described herein.

In block 602, a logic device provides a waypoint database to a portable electronic device. For example, controller 130 of sonar system user interface 120/130 may be configured to provide waypoint database 240 to portable electronic device 220 over a wireless communication link. In various embodiments, waypoint database 240 may include at least one fishing waypoint 316 configured to identify a position and/or depth corresponding to fish detected in sonar imagery 330 generated by sonar transducer assembly 112.

In block 604, a logic device provides position data to the portable electronic device. For example, controller 130 of sonar system user interface 120/130 may be configured to provide position data 242 from an SPOS (e.g., orientation sensor 140, gyroscope/accelerometer 144 and/or GPS 146) to portable electronic device 220 over a wireless communication link. In block 606, a logic device provides sonar imagery to a portable electronic device. For example, controller 130 of sonar system user interface 120/130 may be configured to provide sonar imagery 310 generated by sonar transducer assembly 112 to portable electronic device 220 over a wireless communication link.

In block 608, a logic device receives an adjusted waypoint database from a portable electronic device. For example, controller 130 of sonar system user interface 120/130 may be configured to receive an adjusted waypoint database 240 from portable electronic device 220 over a wireless communication link. In block 610, a logic device renders at least a portion of an adjusted waypoint database. For example, controller 130 of sonar system user interface 120/130 may be configured to render at least a portion of an adjusted waypoint database 240, such as in chart 310 of FIG. 3.

In various embodiments, image data, position data, orientation data, and/or sonar data acquired and/or processed in processes 500 and/or 600 may be used to control operation of mobile structure 101, such as by controlling steering sensor/actuator 150 and/or propulsion system 170 to steer mobile structure 101 according to an orientation of display 226, for example, and/or according to positions and/or other characteristics of various waypoints. It is contemplated that any one or combination of methods to provide waypoint sharing may be performed according to one or more operating contexts of a control loop, for example, such as a startup, learning, running, and/or other type operating context. For example, processes 500 and/or 600 may proceed back to block 502 and/or 602 and proceed through process 500 and/or 600 again to produce updated waypoint sharing, as in a control loop.

Embodiments of the present disclosure can thus provide waypoint sharing. Such embodiments may be used to provide waypoints to assist in navigation for a mobile structure, survey of a body of water, and/or to assist in the operation of other systems, devices, and/or sensors coupled to the mobile structure.

Figure 7:
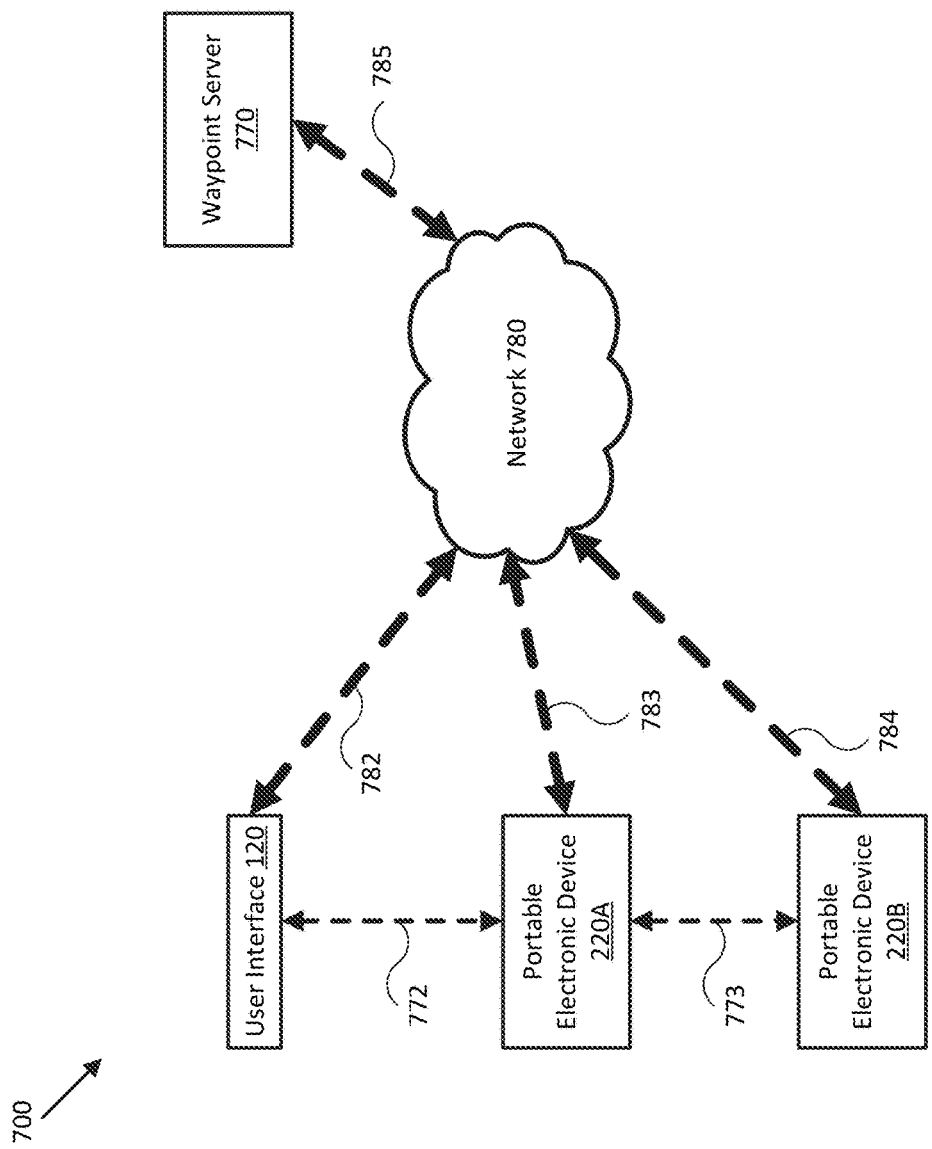
FIG. 7 illustrates a block diagram of a waypoint sharing system in accordance with an embodiment of the disclosure.

In additional embodiments, systems 100 and 100B, portable electronic device 220, corresponding displays 300 and 400, and processes 500 and 600 may be modified to perform waypoint sharing among multiple devices, for example, and/or across a local and/or wide area network, such as by synchronizing a waypoint database across multiple devices and/or with a physically remote waypoint server. FIG. 7 illustrates a block diagram of such a waypoint sharing system 700 in accordance with an embodiment of the disclosure.

As shown in FIG. 7, waypoint sharing system 700 may include user interface 120, one or more portable electronic devices 220A and 220B, and waypoint server 770 accessible over network 780 and one or more wide area network (WAN) links 782-785 and/or local area network links 772-773, as shown. For example, in some embodiments, user interface 120 may be configured to access a waypoint database residing on waypoint server 770 (e.g., residing within a server memory similar to memory 222B of FIG. 2B) over LAN link 772 (e.g., established between user interface 120 and portable electronic device 22A) and WAN link 783 (e.g., established between portable electronic device 220A and network 780).

In general, waypoint server 770 may act as an intermediary for any communications between a portable electronic device (e.g., portable electronic device 220 of FIG. 2A) and a sonar system user interface (e.g., user interface 120 of FIG. 1A), such as the communications described with respect to processes 500 and 600 of FIGS. 5 and 6. Waypoint server 770 may be implemented with any one or combination of the elements of system 100 of FIG. 1A, portable electronic device 220 of FIG. 2A, and memory 220B of FIG. 2B. More particularly, waypoint server 770 may be implemented with one or more of a controller (e.g., controller 130 and/or 221), a memory (memory 222 and/or 222B), a communications module (e.g., communications module 227), a user interface (e.g., user interface 120), and one or more other modules (other modules 180 and/or 228) configured to facilitate storing and synchronizing a waypoint database across multiple devices. In various embodiments, any one or more of the elements of waypoint server 770 and/or waypoint server 770 itself (and corresponding WAN link 785) may be implemented in a distributed manner, for example, so as to leverage multiple distributed hardware implementations for increased communication and/or storage capacity.

Network 780 may be implemented by a LAN, a WAN, and/or a combination of LANS and WANs configured to allow user interface 120 and portable electronic devices 220A and 220B to communicate with waypoint server 770 over one or more of WAN links 782-785. In various embodiments, WAN links 782-785 may be implemented by wired and/or wireless network links configured to communicatively link user interface 120, portable electronic devices 220A and 220B, and waypoint server 770 to network 780. LAN links 772-773 may be implemented by wired and/or wireless network links configured to communicatively link user interface 120 with portable electronic devices 220A and 220B without reliance on network 780. In some embodiments, LAN links 772-773 may be distributed according to different network topologies, such as a star topology, with one of user interface 120 and portable electronic devices 220A and 220B acting as an access point or central network node. User interface 120 may be implemented similar to user interface 120 in FIG. 1A, and each of portable electronic devices 220A and 220B may be implemented similar to portable electronic device 220 in FIG. 2A. In some embodiments, portable electronic device 220A may be implemented as a smart phone (e.g., primarily for viewing and selecting waypoints), for example, and portable electronic device 220B may be implemented as a tablet computing device (e.g., for viewing, selecting, and positioning waypoints).

In an analog to process 500 of FIG. 5 modified to accommodate waypoint sharing system 700, portable electronic device 220A or 220B may be configured to one or more of establish a communication link to waypoint server 770, receive a waypoint database front waypoint server 770, render a waypoint described in the waypoint database in an image of a scene including the waypoint, receive user input to adjust the waypoint database, and provide the adjusted waypoint database to waypoint server 770, as described herein. The waypoint database residing on waypoint server 770 may, in some embodiments, be provided by previous communications with user interface 120 (e.g., a sonar system user interface) and/or another portable electronic device.

In further embodiments, waypoint server 770 may also store position data, provided by user interface 120 and/or portable user interfaces 220A or 220B, and provide the position data along with the waypoint database to allow for contextual rendering of the scene including the waypoint (e.g., by providing a position of mobile structure 101, an element of waypoint sharing system 100 of FIG. 1 and/or portable electronic devices 220A or 220B). Once the adjusted waypoint database is provided to waypoint server 770, waypoint server 770 may be configured to push the updated waypoint database to user interface 120, for example, or to provide the updated waypoint database to user interface 120 and/or other devices upon request.

In another analog to process 500 of FIG. 5 modified to accommodate waypoint sharing system 700, waypoint server 770 may be configured to one or more of establish a communication link to any one of user interface 120 and/or portable electronic device 220A or 220B, receive a waypoint database from user interface 120 and/or portable electronic device 220A or 220B, and provide the waypoint database to another one of user interface 120 and/or portable electronic device 220A or 220B.

In an analog to process 600 of FIG. 6 modified to accommodate waypoint sharing system 700, user interface 120 (e.g., a sonar system user interface) may be configured to one or more of provide a waypoint database to waypoint server 770, provide position data to waypoint server 770, provide sonar imagery to waypoint server 770, receive an adjusted waypoint database from waypoint server 770, and render at least a portion of the adjusted waypoint database, as described herein. In between the providing the waypoint database, position data, sonar imagery, and/or other data to waypoint server 770 and the receiving the adjusted waypoint database from waypoint 770, waypoint server 770 may be configured to provide the waypoint database and/or other data to one or more of portable electronic devices 220A and 220B for user adjustment, as described herein.

In another analog to process 600 of FIG. 6 modified to accommodate waypoint sharing system 700, waypoint server 770 may be configured to one or more of provide a waypoint database to one of user interface 120 and/or portable electronic device 220A or 220B, provide position data to one of user interface 120 and/or portable electronic device 220A or 220B, provide sonar imagery to one of user interface 120 and/or portable electronic device 220A or 220B, and receive an adjusted waypoint database from one of user interface 120 and/or portable electronic device 220A or 220B, as described herein. In between the providing the waypoint database, position data, sonar imagery, and/or other data to a device and the receiving the adjusted waypoint database from the device, waypoint server 770 may be configured to provide the waypoint database and/or other data to other devices for user adjustment, as described herein.

Upon receiving multiple different adjusted waypoint databases, waypoint server 770 may be configured to store multiple different waypoint databases (e.g., ordered by time of adjustment or upload, user device, and/or other order parameters), for example, or to merge the updated waypoint databases according to a user selected merge ruleset including one or more merge rules such as append where possible, first or last in time (e.g., of adjustment or of upload) takes priority, one device (e.g., user interface 120) takes priority over other devices (e.g., portable user devices 220A or 220B), such as according to a hierarchy ordering of device priorities, and/or other merge rules.

In various embodiments, processes 500 and/or 600, as described in reference to FIGS. 5 and 6 and/or as described in reference to waypoint server 770 of FIG. 7, may be implemented as a non-transitory machine-readable medium storing a plurality of machine readable instructions which when executed by one or more logic devices (e.g., controller 130, controller 221) of system 100, user interface/controller 120/130, portable electronic device 220, and/or waypoint server 770, are adapted to cause the corresponding device to perform one or more of the various processes or portions thereof described herein. For example, a server accessible over network 780 may provide such machine readable instructions for download (e.g., to memory 222B) by user interface 120, portable electronic devices 220A or 220B, and/or waypoint server 770. In some embodiments, waypoint server 770 may be configured to store and provide such machine readable instructions for download over network 780 to the other devices. In other embodiments, user interface 120 may be configured to store and provide such machine readable instructions to portable electronic devices 220A and/or 200B over LAN links 772-773 and/or WAN links 782-784.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a portable electronic device comprising a display, a communications module, and a logic device, wherein the logic device is configured to:
receive a waypoint database from a sonar system user interface or a waypoint server over a wireless communication link established using the communications module;
receive user input to adjust at least a portion of the waypoint database; and
provide the adjusted waypoint database to the sonar system user interface or the waypoint server over the wireless communication link.

2. The system of claim 1, wherein the logic device is configured to:
establish the wireless communication link to the sonar system user interface or the waypoint server using the communications module.

3. The system of claim 1, wherein the logic device is configured to:
render, on the display, a waypoint described in the waypoint database in an image of a scene including the waypoint.

4. The system of claim 3, wherein the logic device is configured to:
receive user input to adjust characteristics of one or more waypoints within the waypoint database, to add one or more waypoints to the waypoint database, and/or to remove one or more waypoints from the waypoint database, to adjust the waypoint database.

5. The system of claim 3, wherein the portable electronic device comprises a visible spectrum imaging module configured capture the image of the scene and an imager position and/or orientation sensor (IPOS) configured to provide a position and/or orientation of the visible spectrum imaging module, and wherein the logic device is configured to:
capture the image of the scene using the visible spectrum imaging module; and
render, on the display, the waypoint and the image according to the position and/or orientation of the visible spectrum imaging module relative to the scene.

6. The system of claim 5, wherein the IPOS is configured to provide an orientation of the visible spectrum imaging module, and wherein the logic device is configured to:
receive position data from the sonar system user interface or the waypoint server over the wireless communication link; and
render, on the display, the waypoint and the image according to the relative orientation of the visible spectrum imaging module and according to the position data received from the sonar system user interface or the waypoint server.

7. The system of claim 1, wherein the logic device is configured to:
receive sonar imagery from the sonar system user interface or the waypoint server over the wireless communication link; and
render, on the display, the sonar imagery received from the sonar system user interface or the waypoint server.

8. The system of claim 1, wherein the logic device is configured to:
store the waypoint database in a memory of the portable electronic device; and
execute a mapping application to render a map of at least a portion of the waypoint database on the display and/or to receive user input to adjust characteristics of one or more waypoints within the waypoint database, to add one or more waypoints to the waypoint database, and/or to remove one or more waypoints from the waypoint database, to adjust the waypoint database.

9. The system of claim 1, wherein:
the portable electronic device is adapted to be held or worn by a user of the system while the user views the display.

10. A system comprising:
a sonar transducer assembly adapted to be mounted to a mobile structure and placed in a body of water; and
a sonar system user interface comprising a logic device configured to communicate with the sonar transducer assembly, a portable electronic device, and/or a waypoint server, wherein the logic device is configured to:
provide a waypoint database to the portable electronic device or the waypoint server over a wireless communication link;
receive an adjusted waypoint database from the portable electronic device or the waypoint server over the wireless communication link; and
render at least a portion of the adjusted waypoint database on a display of the sonar system user interface.

11. The system of claim 10, wherein:
the sonar transducer assembly comprises a sonar position and/or orientation sensor (SPOS); and
the logic device is configured to provide position data provided by the SPOS to the portable electronic device or the waypoint server over the wireless communication link.

12. The system of claim 10, wherein:
the logic device is configured to provide sonar imagery generated by the sonar transducer assembly to the portable electronic device or the waypoint server over the wireless communication link.

13. The system of claim 10, wherein:
the mobile structure comprises a watercraft;
the waypoint database comprises at least one fishing waypoint configured to identify a position and/or depth corresponding to fish detected in sonar imagery generated by the sonar transducer assembly; and
the portable electronic device is configured to receive the waypoint database from the sonar system user interface over the wireless communication link, receive user input to adjust at least a portion of the waypoint database, and provide the adjusted waypoint database over the wireless communication link, wherein the user input modifies the received waypoint database to generate the adjusted waypoint database.

14. A method comprising:
receiving a waypoint database from a sonar system user interface or a waypoint server over a wireless communication link;
receiving user input to adjust at least a portion of the waypoint database; and
providing the adjusted waypoint database to the sonar system user interface or the waypoint server over the wireless communication link.

15. The method of claim 14, further comprising:
establishing the wireless communication link to the sonar system user interface or the waypoint server using a communications module.

16. The method of claim 14, further comprising:
rendering, on the display, a waypoint described in the waypoint database in an image of a scene including the waypoint.

17. The method of claim 16, further comprising:
receiving user input to adjust characteristics of one or more waypoints within the waypoint database, to add one or more waypoints to the waypoint database, and/or to remove one or more waypoints from the waypoint database, to adjust the waypoint database.

18. The method of claim 16, further comprising:
capturing the image of the scene using a visible spectrum imaging module; and
rendering, on a display, the waypoint and the image according to a position and/or orientation of the visible spectrum imaging module relative to the scene provided by an imager position and/or orientation sensor (IPOS) configured to provide a position and/or orientation of the visible spectrum imaging module.

19. The method of claim 18, wherein the IPOS is configured to provide an orientation of the visible spectrum imaging module, the method further comprising:
receiving position data from the sonar system user interface or the waypoint server over the wireless communication link; and
rendering, on the display, the waypoint and the image according to the relative orientation of the visible spectrum imaging module and according to the position data received from the sonar system user interface or the waypoint server.

20. The method of claim 14, further comprising:
receiving sonar imagery from the sonar system user interface or the waypoint server over the wireless communication link; and
rendering, on a display, the sonar imagery received from the sonar system user interface or the waypoint server.

21. The method of claim 14, further comprising:
storing the waypoint database in a memory of a portable electronic device; and
executing a mapping application to render a map of at least a portion of the waypoint database on the display and/or to receive user input to adjust characteristics of one or more waypoints within the waypoint database, to add one or more waypoints to the waypoint database, and/or to remove one or more waypoints from the waypoint database, to adjust the waypoint database.

22. The method of claim 14, further comprising:
providing the waypoint database to a portable electronic device or the waypoint server over the wireless communication link;
receiving an adjusted waypoint database from the portable electronic device or the waypoint server over the wireless communication link; and rendering at least a portion of the adjusted waypoint database on a display of the sonar system user interface.

23. The method of claim 22, wherein:
the sonar transducer assembly comprises a sonar position and/or orientation sensor (SPOS); and
the method comprises providing position data provided by the SPOS to the portable electronic device or the waypoint server over the wireless communication link.

24. The method of claim 22, further comprising:
providing sonar imagery generated by a sonar transducer assembly to the portable electronic device or the waypoint server over the wireless communication link.

25. The method of claim 22, wherein:
the waypoint database comprises at least one fishing waypoint configured to identify a position and/or depth corresponding to fish detected in sonar imagery generated by a sonar transducer assembly.

26. A non-transitory machine-readable medium storing a plurality of machine readable instructions which when executed by one or more logic devices of a portable electronic device are adapted to cause the portable electronic device to perform the method of claim 14.

* * * * *

UNITED STATES PATENT AND TRADEMARK OFFICE
CERTIFICATE OF CORRECTION

PATENT NO. : 10,444,349 B2
APPLICATION NO. : 15/441148
DATED : October 15, 2019
INVENTOR(S) : Christopher Daniel Gatland Page 1 of 1

It is certified that error appears in the above-identified patent and that said Letters Patent is hereby corrected as shown below:

On the Title Page

In the Abstract:
Line 14, change "communication ink" to --communication link--.

In the Specification

Column 1, Line 8, change "Application. No." to --Application No.--.

Column 1, Line 53, change "devices iii communication" to --devices in communication--.

Column 12, Line 65, change "bracket/elect" to --bracket/electrical--.

Column 15, Line 34, change "application Ser. No." to --application--.

Column 15, Line 43, change "described U.S. patent application Ser. No." to --described in U.S. patent application--.

Column 18, Line 39, change "memory 2228" to --memory 222B--.

Column 21, Line 54, change "database 740" to --database 240--.

Signed and Sealed this
Fourth Day of February, 2020

Andrei Iancu
*Director of the United States Patent and Trademark Office*